(12) United States Patent
Lum et al.

(10) Patent No.: US 9,071,302 B2
(45) Date of Patent: Jun. 30, 2015

(54) RADIO-FREQUENCY POWER AMPLIFIER CIRCUITRY WITH POWER SUPPLY VOLTAGE OPTIMIZATION CAPABILITIES

(75) Inventors: Nicholas W. Lum, Santa Clara, CA (US); William J. Noellert, Mountain View, CA (US); Ronald W. Dimpflmaier, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 307 days.

(21) Appl. No.: 13/226,367

(22) Filed: Sep. 6, 2011

(65) Prior Publication Data

US 2013/0059546 A1 Mar. 7, 2013

(51) Int. Cl.
*H04B 1/38* (2006.01)
*H04B 1/04* (2006.01)

(52) U.S. Cl.
CPC ..................... *H04B 1/0475* (2013.01)

(58) Field of Classification Search
USPC ................ 455/73, 127.1, 343.1; 323/318
See application file for complete search history.

(56) References Cited

U.S. PATENT DOCUMENTS

| | | | |
|---|---|---|---|
| 6,281,755 B1* | 8/2001 | Feld et al. ..................... | 330/302 |
| 2003/0040343 A1* | 2/2003 | Epperson et al. ............. | 455/572 |
| 2006/0067426 A1* | 3/2006 | Maltsev et al. ............... | 375/297 |
| 2008/0025254 A1 | 1/2008 | Love et al. | |
| 2008/0261540 A1* | 10/2008 | Rohani et al. ................ | 455/77 |
| 2009/0161793 A1 | 6/2009 | Nentwig | |
| 2009/0278609 A1* | 11/2009 | Srinivasan et al. ........... | 330/297 |
| 2009/0315622 A1 | 12/2009 | Suzuki et al. | |
| 2010/0148745 A1* | 6/2010 | Kanou .......................... | 323/318 |
| 2010/0197365 A1 | 8/2010 | Ripley et al. | |
| 2011/0050347 A1 | 3/2011 | Trainor et al. | |

OTHER PUBLICATIONS

Ruso, "RF Power Amplifiers" [retrieved on Aug. 26, 2011] Retrieved from the Internet: < URL: http://www.qsl.net/va3iul.
"LTE Resourse Guide" Anritsu Company, 2009. [retrieved on Aug. 25, 2011] Retrieved from the Internet: <URL: http://www.us.anritsu.com.
"Orthogonal Frequency Division Multiplexing" Langton 2004. [retrieved on Aug. 25, 2011] Retrieved from the Internet: < URL: http://www.complextoreal.com.

* cited by examiner

*Primary Examiner* — Hsin-Chun Liao
(74) *Attorney, Agent, or Firm* — Treyz Law Group; Chih-Yun Wu; Michael H. Lyons

(57) ABSTRACT

Electronic devices with wireless communications capabilities are provided. The electronic device may include storage and processing circuitry, power amplifier circuitry, power supply circuitry, etc. The storage and processing circuitry may direct the power amplifier circuitry to operate using a desired power mode, in allocated resource blocks within a particular frequency channel, and at a given output power level. The power supply circuitry may bias the power amplifier circuitry with a power supply voltage. The electronic device may be subject to in-band emissions requirements and adjacent channel leakage requirements that restrict the power levels produced by the device on frequencies that are not allocated to the device. The electronic device may optimize the power amplifier supply voltage based on allocated resource blocks by minimizing the supply voltage to reduce power consumption while ensuring that emissions requirements are satisfied.

18 Claims, 9 Drawing Sheets

RADIO-FREQUENCY POWER AMPLIFIER CIRCUITRY WITH POWER SUPPLY VOLTAGE OPTIMIZATION CAPABILITIES

BACKGROUND

This invention relates generally to wireless communications circuitry, and more particularly, to ways in which to optimize wireless communications performance by making power amplifier power supply voltage adjustments.

Integrated circuits often have wireless communications circuitry that includes radio-frequency power amplifiers. Radio-frequency power amplifiers are used to amplify radio-frequency signals for wireless transmission in a desired channel.

Radio-frequency power amplifiers typically exhibit reduced power consumption at lower supply voltages. Lowering the supply voltage that biases the power amplifiers directly decreases the supply current that flows through the radio-frequency power amplifiers, thereby saving power. Lowering the supply voltage, however, degrades power amplifier linearity. Degrading power amplifier linearity in this way may undesirably increase radio-frequency emissions on frequencies that are outside the transmission frequencies.

It would therefore be desirable to be able to provide improved power supply biasing capabilities to wireless devices.

SUMMARY

Electronic devices may include wireless communications circuitry. The wireless communications circuitry may include storage and processing circuitry, radio-frequency input-output circuits, radio-frequency power amplifier circuitry, adjustable power supply circuitry, and other wireless circuits.

The radio-frequency input-output circuits may feed signals to the power amplifier circuitry. The power amplifier circuitry may amplify the signals prior to wireless transmission. The power amplifier circuitry may include multiple power amplifier stages. The storage and processing circuitry may control these stages to place the power amplifier circuitry in a desired power mode. For example, the power amplifier may be placed into a high power mode by enabling all of the power amplifier stages or may be placed into a low power mode by enabling one of the power amplifier stages. The power mode may also be adjusted by adjusting a bias voltage or bias current to each stage of the power amplifier.

The storage and processing circuitry may bias the power amplifier circuitry at a desired positive power supply voltage. The power supply voltage may be supplied to each of the power amplifier stages. Adjustments to the power supply may be made to ensure that emissions requirements are satisfied while minimizing power consumption.

A wireless electronic device may communicate with a base station via radio-frequency signals in a frequency channel (e.g., a range of frequencies). The base station may allocate resource blocks within the frequency channel to the wireless electronic device. Each resource block may correspond to a range of frequencies within the frequency channel. To communicate with the base station, the wireless electronic device may transmit radio-frequency signals in the allocated resource blocks.

The wireless electronic device may be subject to emissions requirements such as adjacent channel leakage ratio (ACLR) requirements and in-band emissions requirements. The adjacent channel leakage ratio requirements may limit the amount of power generated by the wireless device on frequencies outside of the transmission frequency channel. The in-band emissions requirements may limit the amount of power generated by the wireless device in resource blocks within the frequency channel that are not allocated to the device.

The amount of undesired emissions (e.g., radio-frequency signals generated outside of allocated resource blocks) produced by the wireless electronic device may be controlled by adjusting the supply voltage provided to the power amplifier. To optimize the power amplifier supply voltage, the wireless device may minimize the supply voltage to reduce power consumption while ensuring that emissions requirements are satisfied.

Further features of the present invention, its nature and various advantages will be more apparent from the accompanying drawings and the following detailed description.

DETAILED DESCRIPTION

This relates generally to wireless communications, and more particularly, to biasing wireless communications circuitry at optimum supply voltage levels in wireless electronic devices.

The wireless electronic devices that are biased in this way may be portable electronic devices such as laptop computers or small portable computers of the type that are sometimes referred to as ultraportables. Portable electronic devices may also be somewhat smaller devices. The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. Wireless electronic devices such as these may perform multiple functions. For example, a cellular telephone may include media player functionality and may have the ability to run games, email applications, web browsing applications, and other software.

Figure 1:
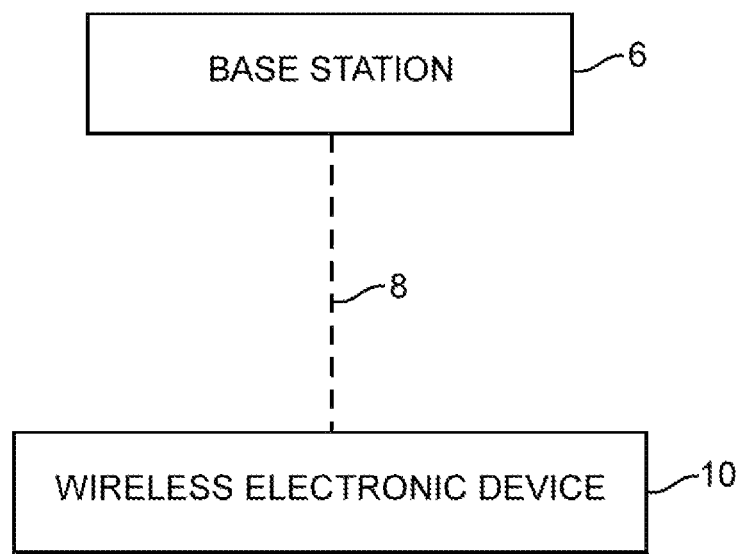
FIG. 1 is a diagram of an illustrative electronic device that may communicate with a base station in accordance with an embodiment of the present invention.

FIG. 1 shows a scenario in which a wireless electronic device 10 may communicate with a base station 6 over a wireless communications link 8. Wireless communications link 8 may be established by radio-frequency transmissions between base station 6 and wireless electronic device 10. Wireless communications link 8 may serve as a data connection over which wireless electronic device 10 may send and receive data from base station 6. The radio-frequency transmissions may be sent using cellular standards such as the 3GPP Long Term Evolution (LTE) protocol.

Figure 2:
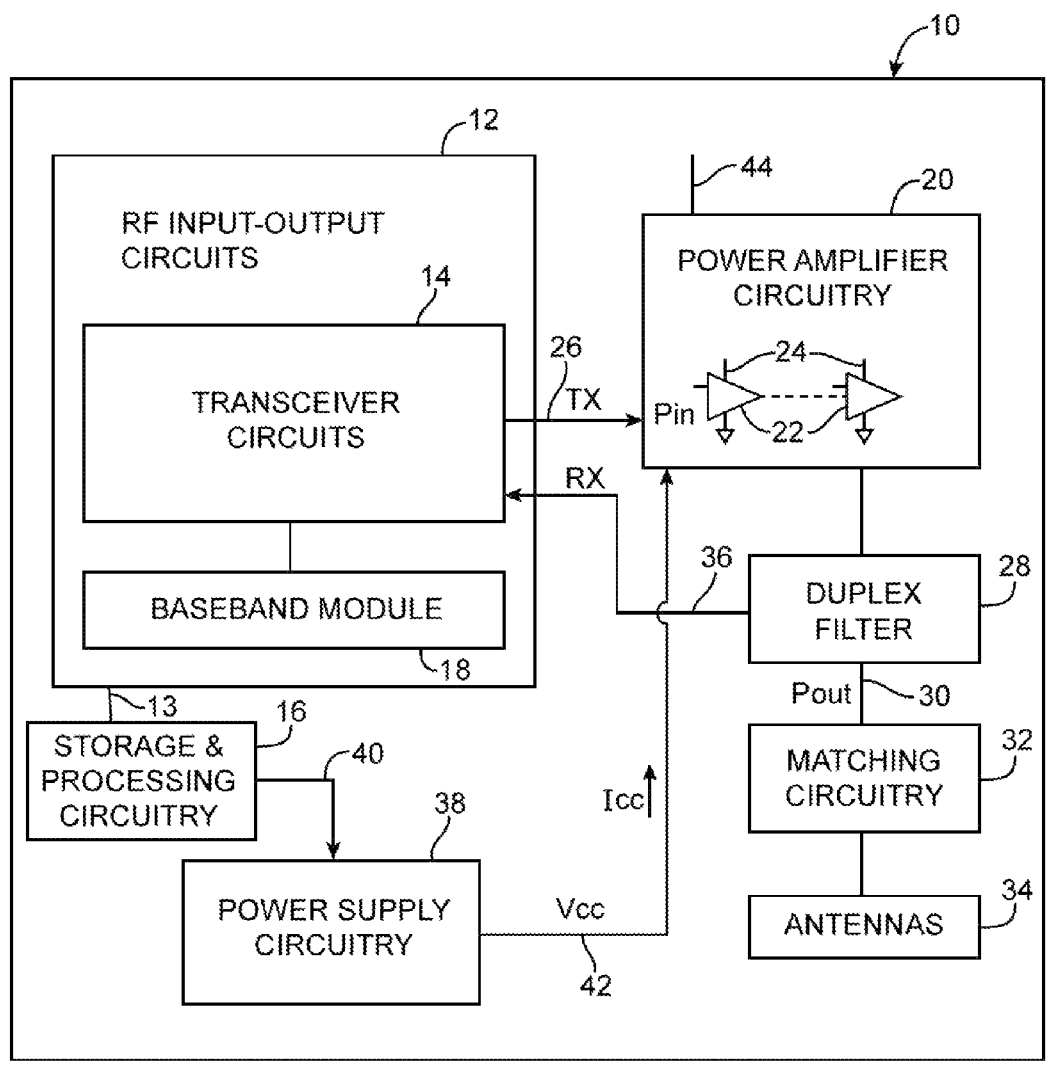
FIG. 2 is a diagram of an illustrative electronic device with wireless communications circuitry in accordance with an embodiment of the present invention.

FIG. 2 shows an illustrative electronic device that includes wireless communications circuitry. As shown in FIG. 2, device 10 may include one or more antennas such as antennas (antenna structures) 34 and may include radio-frequency (RF) input-output circuits 12. During signal transmission operations, circuitry 12 may supply radio-frequency signals that are transmitted by antennas 34. During signal reception operations, circuitry 12 may accept radio-frequency signals that have been received by antennas 34.

The antenna structures and wireless communications circuitry of device 10 may support communications over any suitable wireless communications bands. For example, the wireless communications circuitry may be used to cover communications frequency bands such as cellular telephone voice and data bands at 850 MHz, 900 MHz, 1800 MHz, 1900 MHz, and the communications band at 2100 MHz band, the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz. The wireless communications bands used by device 10 may include the so-called LTE (Long Term Evolution) bands. The LTE bands are numbered (e.g., 1, 2, 3, etc.) and are sometimes referred to as E-UTRA operating bands.

Device 10 can cover these communications bands and other suitable communications bands with proper configuration of the antenna structures in the wireless communications circuitry. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Device 10 may include storage and processing circuitry such as storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 16 may be used in controlling the operation of device 10. Processing circuitry in circuitry 16 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as Wi-Fi®), protocols for other short-range wireless communications links such as the Bluetooth® protocol, protocols for handling 2G cellular telephone communications services, 3 G communications protocols, 4 G communications protocols such as LTE, etc.

Data signals that are to be transmitted by device 10 may be provided to baseband module 18. Baseband module 18 may be implemented using a single integrated circuit (e.g., a baseband processor integrated circuit) or using multiple integrated circuits.

Baseband processor 18 may receive signals to be transmitted over antenna 34 over path 13 from storage and processing circuitry 16. Baseband processor 18 may provide signals that are to be transmitted to transmitter circuitry within RF transceiver circuitry 14. The transmitter circuitry may be coupled to radio-frequency power amplifier circuitry 20 via transmit path 26. Path 13 may also carry control signals from storage and processing circuitry 16. These control signals may be used to control the power of the radio-frequency signals that the transmitter circuitry within transceiver circuitry 14 supplies to the input of power amplifiers 20 via path 26. For example, the control signals may be provided to a variable gain amplifier located inside transceiver circuits 14 that controls the power of the radio-frequency signals supplied to the input of power amplifiers 20. This transmitted radio-frequency signal power level is sometimes referred to herein as Pin, because it represents the input power to power amplifier circuitry 20.

During data transmission, power amplifier circuitry 20 may boost the output power of transmitted signals to a sufficiently high level to ensure adequate signal transmission. Circuitry 28 may contain a radio-frequency duplexer and other radio-frequency output stage circuitry such as radio-frequency switches and passive elements. Switches may, if desired, be used to switch the wireless circuitry between a transmitting mode and a receiving mode. Duplex filter 28 (sometimes referred to as a duplexer) may be used to route input and output signals based on their frequency.

Matching circuitry 32 may include a network of passive components such as resistors, inductors, and capacitors and ensures that antenna structures 34 are impedance matched to the rest of the wireless circuitry. Wireless signals that are received by antenna structures 34 may be passed to receiver circuitry in transceiver circuitry 14 over a receive path such as path 36.

Each radio-frequency power amplifier (e.g., each power amplifier in power amplifier circuitry 20) may include one or more power amplifier stages such as stages 22. As an example, each power amplifier may be used to handle a separate communications band and each such power amplifier may have three series-connected power amplifier stages 22. Stages 22 may have power supply terminals such as terminals 24 that receive bias voltages. Bias supply voltage may be supplied to terminals 24 using path 42. Control signals from storage and processing circuitry 16 may be used to selectively enable and disable stages 22 or to control the gain of individual stages using control path 44.

By enabling and disabling stages 22 selectively and/or adjusting the gain of individual stages separately, the power amplifier may be placed into different power modes. For example, the power amplifier may be placed into a high power mode by enabling all three of power amplifier stages 22 or may be placed into a low power mode by enabling two of the power amplifier stages. Other configurations may be used if desired. For example, a very low power mode may be supported by turning on only one of three gain stages or arrangements with more than three power mode settings may be provided by selectively enabling other combinations of gain stages (e.g., in power amplifiers with three or more than three gain stages). As another example, the power amplifier may be placed into a high power mode by increasing bias currents provided to one or more of the stages to increase the gain and/or maximum power output of the power amplifier (e.g., control signals may be provided via path 44 to power amplifier circuitry 20 that adjust bias currents provided to amplifiers 22). By adjusting the power mode of the amplifier, the output power capabilities of power amplifier circuitry 20 may be adjusted to maximize efficiency (e.g., for a given desired output power).

Device 10 may include adjustable power supply circuitry such as power supply circuitry 38. Adjustable power supply circuitry 38 may be controlled by control signals received over control path 40. The control signals may be provided to adjustable power supply circuitry 38 from storage and processing circuitry 16 or any other suitable control circuitry (e.g., circuitry implemented in baseband module 18, circuitry in transceiver circuits 14, etc.).

Storage and processing circuitry 16 may maintain a table of control settings or other stored information to be used in controlling power supply circuitry 38. The table may include a list of bias voltages (Vcc values) that are to be supplied by adjustable power supply circuitry 38. Based on the known operating conditions of circuitry 44 such as its current gain settings (e.g., a high power mode or a low power mode), the desired output power value Pout to be produced by power amplifier circuitry 20 (e.g., the output power from amplifier circuitry 20 as measured at output 30 of duplex filter 28), the desired transmit frequency, resource block allocation (e.g., how many resource blocks are allocated to the device and/or the locations of the resource blocks within a frequency channel), and based on the values of the control settings in the table, storage and processing circuitry 16 may generate appropriate control signals on path 40 (e.g., analog control voltages or digital control signals).

The control signals that are supplied by circuitry 16 on path 40 may be used to adjust the magnitude of the positive power supply voltage Vcc (sometimes referred to as the amplifier bias) that is provided to power amplifier circuitry 20 and terminal 42 over path 42. These power supply voltage adjustments may be made during testing and during normal operation of device 10.

Figure 3:
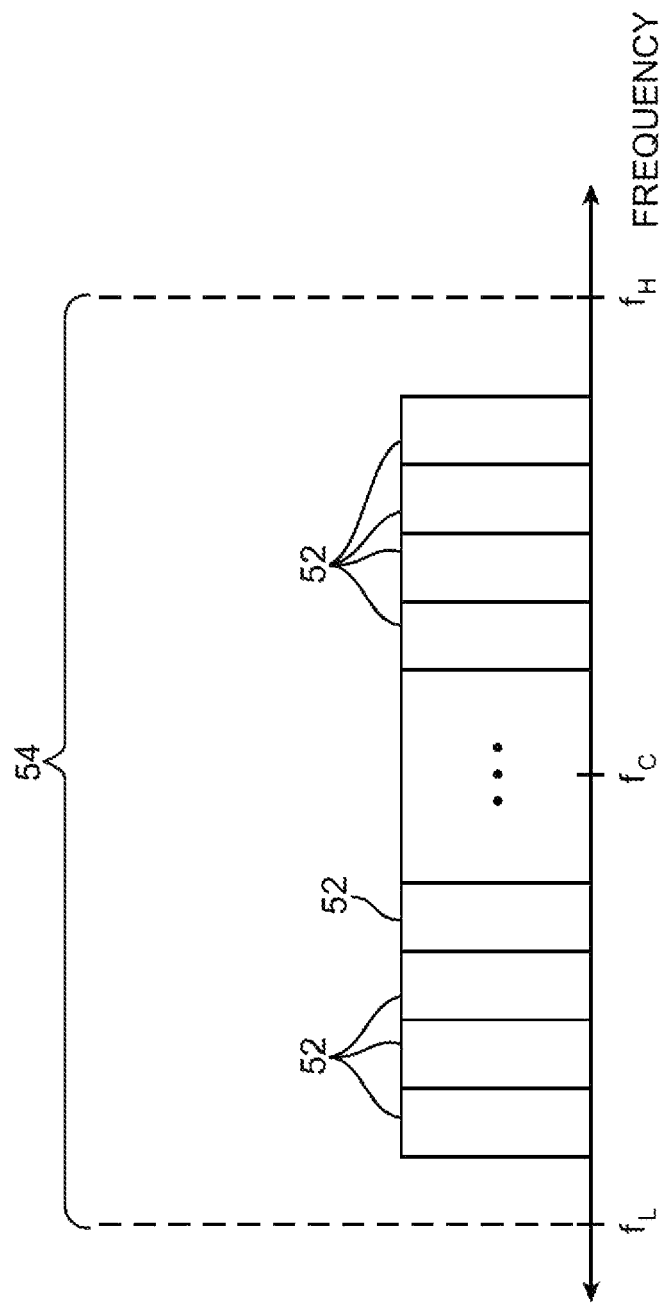
FIG. 3 is a diagram showing an illustrative frequency band that is partitioned into resource blocks in accordance with an embodiment of the present invention.

FIG. 3 shows how a channel (band) 54 may be partitioned in frequency into resource blocks 52. Channel 54 may be a frequency range in which device 10 may communicate with base station 6. For example, channel 54 may be LTE band 9, band 13, etc. Channel 54 may be bounded by a low frequency $f_L$ and a high frequency $f_H$. For example, LTE band 9 may have a low frequency $f_L$ of approximately 1750 MHz and a high frequency $f_H$ of approximately 1785 MHz.

The available bandwidth of channel 54 may be partitioned into any desired number of resource blocks 52 (e.g., resource blocks 52 may be frequency ranges within the frequency channel). For example, an LTE channel may be partitioned into 50 resource blocks 52 that are allocated to wireless electronic devices by a base station. Wireless electronic device 10 may communicate with a base station by transmitting radio-frequency signals on the frequencies associated with resource blocks that are allocated to the wireless electronic device. The data rate at which device 10 may communicate with the base station may correspond to the number of resource blocks that have been allocated to device 10 (e.g., the bandwidth allocated to device 10).

Wireless device 10 may be expected to transmit radio-frequency signals only in resource blocks that have been allocated to the device. However, power amplifier circuitry 20 may undesirably produce radio-frequency signals on frequencies that have not been allocated to power amplifier circuitry 20. For example, the output signal of power amplifier circuitry 20 may include intermodulation components at frequencies outside of the transmission frequency range (e.g., outside of the allocated resource blocks). The wireless emissions produced at frequencies outside of the transmission frequency range may sometimes be referred to as spectral regrowth. The amount of wireless emissions produced at frequencies outside of the transmission frequency range may depend on the linearity of power amplifier circuitry 20 (e.g., how linearly power amplifier circuitry 20 amplifies input signals).

The linearity of power amplifier circuitry 20 may be dependent on the supply voltage provided to the power amplifier. For example, if the supply voltage is too low, then the power amplifier may have insufficient headroom to linearly amplify input signals. In this scenario, input signals that are too large may result in amplified output voltages that are limited by the power supply voltage (sometimes referred to as gain compression). The gain of power amplifier circuitry 20 may therefore be dependent on the amplitude of the input voltage. In other words, the output signal of the amplifier may no longer linearly correspond to the input signal. Non-linear amplification by power amplifier circuitry 20 may produce spectral content on frequencies that are not present in the input signal.

Figure 4:
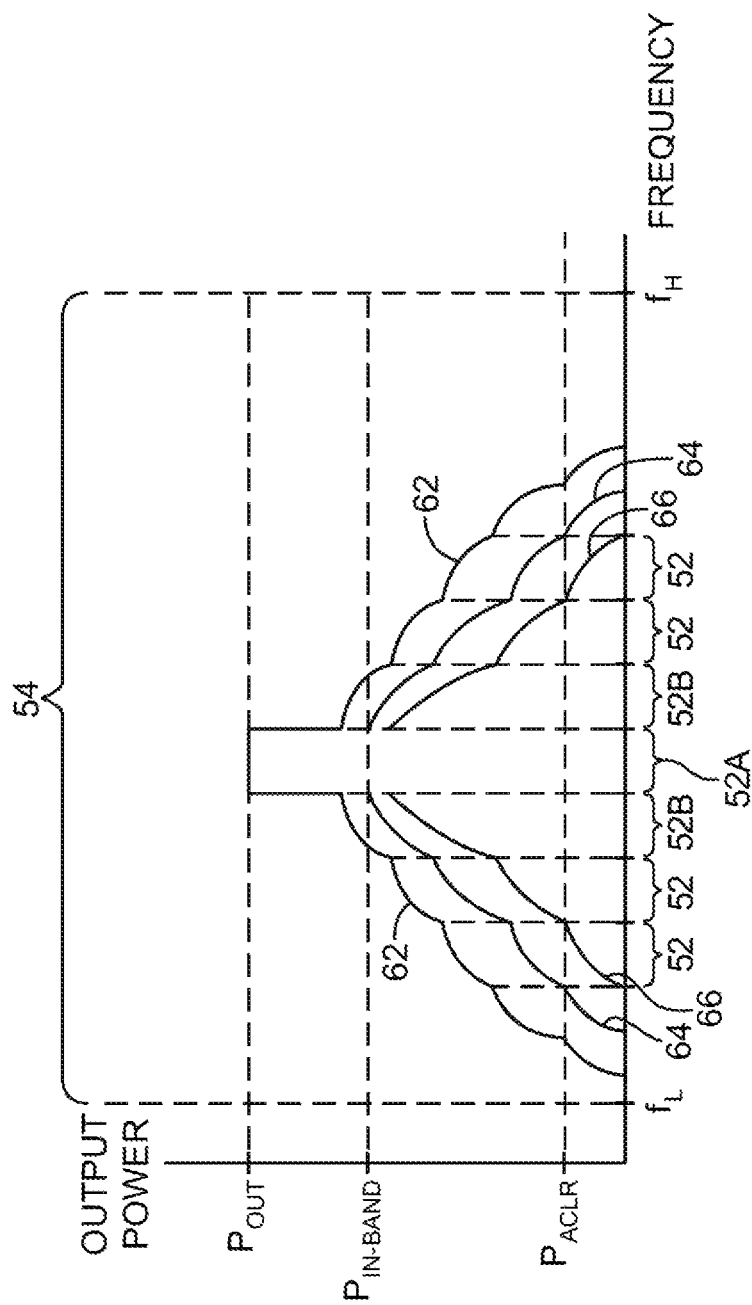
FIG. 4 is a graph illustrating how power amplifier supply voltage may be adjusted to satisfy emissions requirements in accordance with an embodiment of the present invention.

By adjusting supply voltage Vcc provided to power amplifier circuitry 20 over path 42 (e.g., as shown in FIG. 2), wireless electronic device 10 may adjust the linearity of the power amplifier, thereby controlling the power levels of radio-frequency signals produced at frequencies that are not allocated to device 10. FIG. 4 shows an illustrative scenario in which a wireless device 10 that is allocated resource block 52A within channel 54 may adjust the supply voltage supplied to power amplifier circuitry 20 to reduce undesirable spectral content such as spectral regrowth (e.g., to reduce radio-frequency signals produced on frequencies outside of resource block 52A). In FIG. 4, an illustrative output power spectrum (e.g., output power levels at various frequencies) of device 10 at various supply voltages is shown.

In the example of FIG. 4, wireless device 10 may transmit radio-frequency signals in allocated block 52B at an output power Pout. Pout may be a minimum power level required to communicate with a base station (e.g., the base station may be unable to properly receive radio-frequency transmissions from device 10 that have a power level lower than Pout). Curves 62, 64, and 66 may represent output power levels of power amplifier circuitry 20 for various frequencies and at respective supply voltages. Curve 62 may represent the output power of power amplifier circuitry 20 at a relatively low supply voltage (e.g., approximately 0.5 V). Curve 64 may represent the output power of power amplifier circuitry 20 at a moderate supply voltage (e.g., approximately 2.0 V). Curve 66 may represent the output power of power amplifier circuitry 20 at a relatively large supply voltage (e.g., approximately 3.0 V). These examples are merely illustrative, curves 62-66 may represent any desirable power amplifier supply voltages in which the supply voltage of curve 66 is greater than the supply voltage of curve 64 and in which the supply voltage of curve 64 is greater than the supply voltage of curve 62.

Output power levels of device 10 in each resource block may depend on the separation in the frequency domain between that resource block and the frequencies of transmission (e.g., the frequencies in allocated resource block 52A). Output power levels for frequencies that are outside of allocated resource block 52A may decrease with increased separation in frequency from the transmission frequency range (e.g., from allocated resource block 52A). For example, the output power levels in resource blocks 52 for curve 62 may be less than the output power levels in resource blocks 52B (e.g., because resource blocks 52 may be farther from the transmission frequency range than resource blocks 52B).

Wireless device 10 may be subject to requirements that limit the maximum power levels of radio-frequency signals that are produced in resource blocks of a given frequency channel that are not allocated to device 10 (sometimes referred to as in-band emissions requirements). Wireless device 10 may be required to maintain in-band emissions below $P_{IN\text{-}BAND}$ (e.g., output power produced by device 10 may be required to remain below $P_{IN\text{-}BAND}$ for frequencies within channel 54 that have not been allocated to device 10). If device 10 were to produce radio-frequency signals in adjacent resource blocks 52B with power levels greater than $P_{IN\text{-}BAND}$ (as shown by curve 62), the operation of another device operating in resource blocks 52B may be disrupted (as an example). The in-band emissions requirements may be determined by the ability of base station 6 to distinguish between transmission signals and interfering signals.

Device 10 may be required to maintain out-of-channel emissions below $P_{ACLR}$ (e.g., output power produced by device 10 may be required to remain below $P_{ACLR}$ for frequencies outside of channel 54). The adjacent channel leakage requirements may be determined by the ability of radio-frequency receivers in other base stations or in other electronic devices to distinguish between transmission signals and interfering signals.

The in-band emission requirements may be less restrictive than the adjacent channel leakage requirements. For example, $P_{IN\text{-}BAND}$ may be 3 dB below $P_{out}$ while $P_{ACLR}$ may be 33 dB below $P_{out}$. The in-band emission requirements may be less restrictive because base station 6 may be able to consume additional power to distinguish between transmission signals and interfering signals, while base stations of different standards may have unknown reception capabilities (as examples).

As shown by curve 62, device 10 that operates at a relatively low supply voltage such as 0.5 V may generate undesired radio-frequency signals in adjacent resource blocks 52 and 52B that are higher than $P_{IN\text{-}BAND}$ (e.g., due to non-linear amplification of the radio-frequency signals in allocated resource block 52A). To prevent the undesired radio-frequency signals from interfering with radio-frequency communications in adjacent resource blocks 52 and 52B, device 10 may increase the power supply voltage provided to power amplifier circuitry 20. As shown by curves 64 and 66, by increasing the supply voltage provided to power amplifier circuitry 20, the power levels of in-band emissions produced by device 10 may be reduced to levels that are below $P_{IN\text{-}BAND}$ while maintaining output transmission power levels at desired output level $P_{out}$ (e.g., because the linearity of power amplifier circuitry 20 may be improved by increasing the supply voltage).

It may be desirable to minimize the power consumed by wireless device 10 while maintaining satisfactory performance. For example, device 10 may be a mobile device that receives power from a battery or other power source that may have a limited amount of available power. In this scenario, it may be desirable to improve battery life by minimizing power consumption while satisfying in-band emissions requirements and adjacent channel emissions requirements. Electronic device 10 may therefore provide the optimal power supply voltage represented by curve 64 to power amplifier circuitry 20 (e.g., a minimum power supply voltage that produces acceptable in-band emissions levels).

The amount of undesired signal power produced on frequencies outside of the transmission frequency range may vary based on the bandwidth of the frequency range. As an example, intermodulation between transmit frequencies may accumulate with increased transmission bandwidth. It may be desirable to optimize the power supply voltage provided to power amplifier circuitry 20 based on the number of resource blocks allocated to device 10 (e.g., because each additional resource block may increase the frequency range of radio-frequency transmissions and thereby increase undesired radio-frequency emissions).

Figure 5:
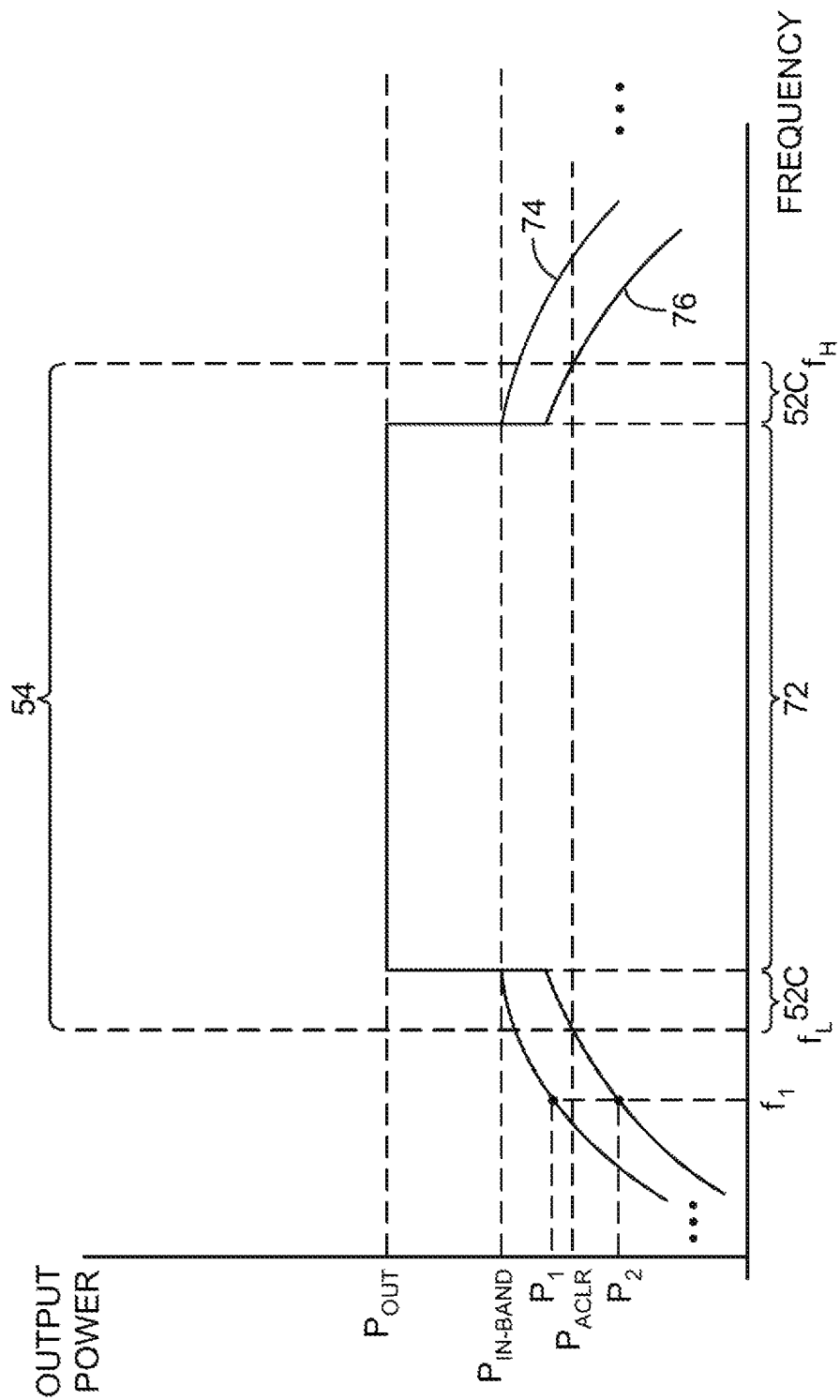
FIG. 5 is a graph illustrating how power amplifier supply voltage may be adjusted based on allocated resource blocks in accordance with an embodiment of the present invention.

FIG. 5 shows a scenario in which wireless electronic device 10 may adjust the power amplifier supply voltage based on the number of resource blocks (e.g., resource blocks 52 of FIG. 4) that are assigned to device 10. In the example of FIG. 5, device 10 may be assigned most of the available resource blocks. The resource blocks assigned to device 10 may cover a frequency range 72 that covers almost all of the available bandwidth in channel 54 (e.g., frequency range 72 may include most of the frequencies between $f_L$ and $f_H$). As an example, frequency range 72 may occupy 48 of 50 available resource blocks, leaving two unallocated resource blocks 52C at the edges of channel 54.

Curve 74 shows an illustrative output power spectrum of device 10 that provides power amplifier circuitry 20 with a first power supply voltage (e.g., 2.0V). As shown by curve 74, at the first power supply voltage, power amplifier circuitry 20 may produce acceptable power levels in resource blocks 52 that are not allocated to device 10 (e.g., power levels of signals produced in resource blocks 52C may be less than $P_{IN\text{-}BAND}$ and satisfy in-band emissions requirements). However, power amplifier circuitry 20 may produce out-of-channel signals (e.g., radio-frequency signals with frequencies less than $f_L$ or greater than $f_H$) that have unacceptable power levels. For example, adjacent channel leakage requirements may be more restrictive than in-band emissions requirements (e.g., $P_{ACLR}$ may be less than $P_{IN\text{-}BAND}$) and power amplifier circuitry 20 may produce power level $P_1$ at frequency $f_1$ that violates adjacent channel leakage ratio (ACLR) requirements (e.g., $P_1$ may be greater than $P_{ACLR}$).

To reduce out-of-channel emissions to acceptable power levels, wireless electronic device 10 may adjust the power amplifier supply voltage to control the linearity of power amplifier circuitry 20. For example, wireless electronic device 10 may adjust power supply circuitry 38 to increase supply voltage Vcc provided to power amplifier circuitry 20, thereby improving the linearity of power amplifier circuitry 20 and reducing out-of-channel emissions.

Curve 76 shows an illustrative output power spectrum for a device 10 that provides a second power amplifier supply voltage to power amplifier circuitry 20. The second power amplifier supply voltage may correspond to an optimal supply voltage that device 10 may provide to power amplifier circuitry 20 to satisfy emissions requirements while minimizing power consumption. As shown by curve 76, power amplifier circuitry 20 may produce output power levels that satisfy in-band emissions requirements and out-of-channel emissions requirements. In other words, by increasing the supply voltage provided to power amplifier circuitry 20, device 10 may reduce wireless emissions in frequencies outside of allocated frequency range 72 to acceptable levels. For example, at the optimal operating supply voltage of curve 76, power amplifier circuitry 20 may produce radio-frequency signals with power level $P_2$ at frequency $f_1$. Power $P_2$ may be sufficiently low to satisfy adjacent channel leakage ratio requirements and in-band emissions requirements (e.g., $P_2$ may be less than $P_{ACLR}$ and $P_{IN-BAND}$). At the optimal power amplifier supply voltage of curve 76, the maximum output power level for any frequency outside of frequency range 72 may be less than $P_{ACLR}$ and $P_{IN-BAND}$.

Figure 6:
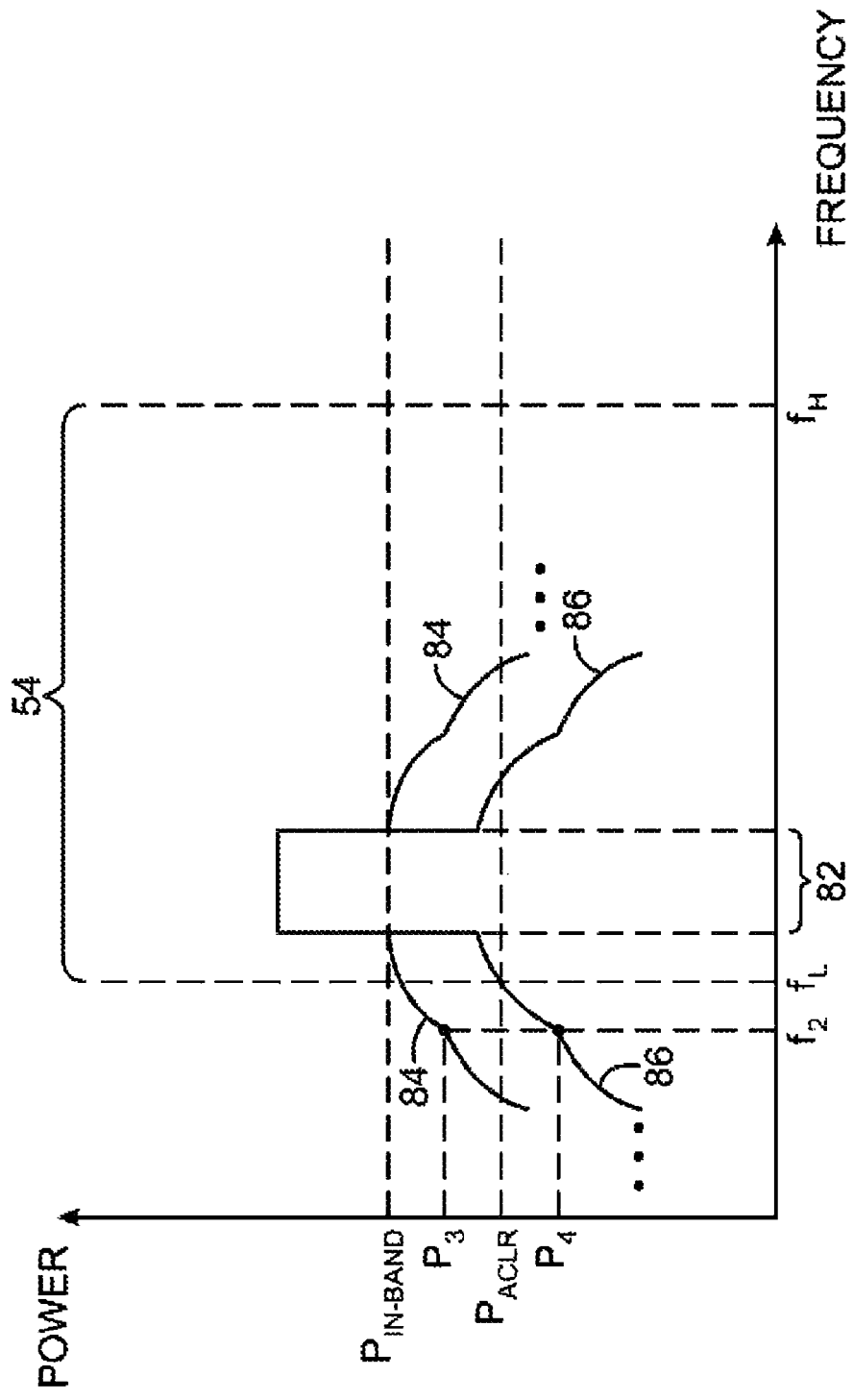
FIG. 6 is a graph illustrating how power amplifier supply voltage may be adjusted based on the location of allocated resource blocks in accordance with an embodiment of the present invention.

The location of resource blocks within a frequency channel (band) may determine the required linearity of power amplifier circuitry 20. FIG. 6 shows an illustrative scenario in which a device 10 that is allocated resource blocks within a frequency range 82 near the boundaries of channel 54 may be subject to more restrictive linearity requirements (e.g., relative to a device 10 such as shown in FIG. 4 that is allocated resource blocks closer to the center frequencies of channel 54).

In the example of FIG. 6, curves 84 and 86 represent output power spectrums of device 10 with a power amplifier circuitry 20 operating at respective first and second supply voltages. For example, curve 84 may correspond to a first supply voltage of 2 volts and curve 86 may correspond to a second supply voltage of 2.9 volts.

As shown by curve 84, the in-band output power produced by power amplifier circuitry 20 at the first supply voltage may satisfy in-band emissions requirements (e.g., output power produced by device 10 may be less than $P_{IN-BAND}$ for frequencies within channel 54). However, because transmission frequency range 82 is relatively close to the edge of channel 54, device 10 may produce output power levels that exceed adjacent channel leakage ratio requirements. For example, device 10 may produce output power level $P_3$ at frequency $f_2$ that exceeds $P_{ACLR}$ (e.g., the maximum power allowed by adjacent channel leakage ratio requirements).

To satisfy adjacent channel leakage ratio requirements, device 10 may improve power amplifier linearity by increasing the power amplifier supply voltage to the second supply voltage, thereby producing the output power levels corresponding to curve 86. As shown by curve 86, at the second supply voltage, device 10 may produce output power levels that satisfy both in-band emissions requirements and adjacent channel leakage ratio requirements (e.g., device 10 may produce output power levels that are below $P_{IN-BAND}$ for frequencies between $f_L$ and $f_H$ and output power levels that are below $P_{ACLR}$ for frequencies less than $f_L$ or greater than $f_H$).

Figure 7:
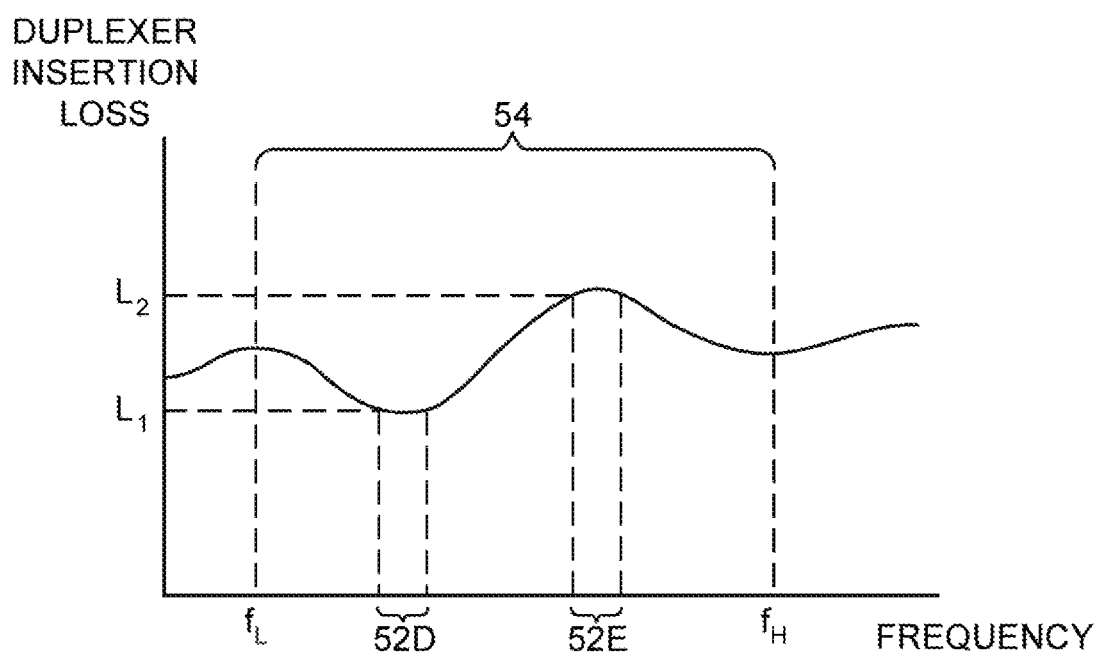
FIG. 7 is a graph illustrating how duplexer insertion loss may vary with frequency in accordance with an embodiment of the present invention.

Wireless electronic device 10 may include components that undesirably change signal properties of the output signal produced by power amplifier circuitry 20. For example, output signals that pass through duplex filter (duplexer) 28 as shown in FIG. 2 may be attenuated due to insertion loss of duplexer 28. Duplexer 28 may attenuate the radio-frequency output of power amplifier circuitry 20 based on the frequencies of the output. FIG. 7 shows a diagram illustrating how duplexer insertion loss may change based on output signal frequencies.

Resource blocks 52D and 52E may correspond to respective frequency ranges. As shown in FIG. 7, the insertion loss introduced by duplexer 28 at the frequency range corresponding to resource block 52D may be approximately L1 and the insertion loss introduced by duplexer 28 at the frequency range corresponding to resource block 52E may be approximately L2. L1 may be less than L2 (e.g., the duplexer may introduce less power loss for resource block 52D than 52E).

The frequency dependent insertion loss introduced by duplexer 28 may affect the relative power levels between a transmitted signal and undesired signals produced by power amplifier nonlinearity. For example, a relatively low duplexer insertion loss L1 for resource block 52D may allow device 10 to achieve a desired output power level without increasing amplifier linearity (e.g., because in-band emissions may be attenuated by relatively high insertion loss). Device 10 may reduce the power supply voltage (e.g., Vcc) provided to power amplifier circuitry 20 when device 10 is allocated resource blocks that correspond to frequencies associated with relatively low duplexer insertion loss. Device 10 may increase the power supply voltage (thereby increasing power amplifier linearity) when device 10 is allocated resource blocks associated with relatively high duplexer insertion loss. In this way, power consumption may be minimized while satisfying emissions requirements.

Figure 8:
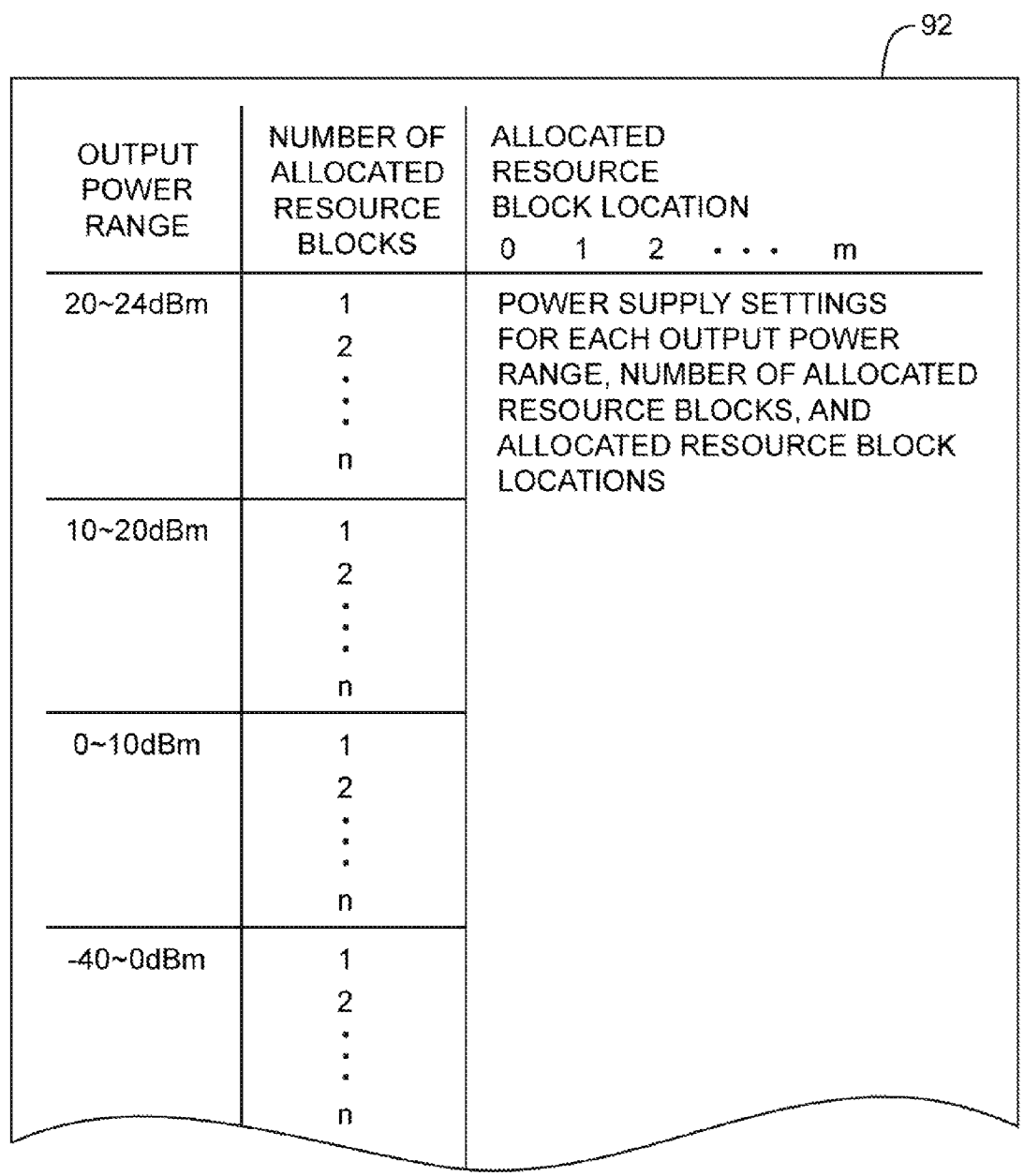
FIG. 8 is an illustrative table that may store power supply settings for various output powers and resource block allocations in accordance with an embodiment of the present invention.

To minimize power consumption while ensuring that power emissions requirements are satisfied, device 10 may be provided with calibration table 92 of FIG. 8. Table 92 may be stored at locations such as storage and processing circuitry 16. Table 92 may include entries that identify optimal supply voltages based on desired transmission output power levels and resource blocks that are allocated to device 10. Higher output power ranges may be assigned optimal supply voltages that are larger than supply voltages assigned to lower output ranges (e.g., because transmitting radio-frequency signals at a relatively high output power level may cause non-linear operation such as clipping). For example, in an output power range of 20-24 dBm, power amplifier circuitry 20 may be provided with a power supply voltage of 2.9 V, while in an output power range of 0-10 dBm, power amplifier circuitry 20 may be provided with a power supply voltage of 1.5 V.

In the example of FIG. 8, the number of allocated resource blocks may range from one resource block to n resource blocks (e.g., any desirable number of resource blocks within the frequency band) and the allocated resource block location within the frequency band may range from location zero to location m (e.g., any desirable location within the frequency band).

The entries of table 92 may identify optimal power amplifier supply voltages based on the number of allocated resource blocks, the locations of the allocated resource blocks within an operating channel, and frequency dependent power loss (e.g., as introduced by components such as duplexer 28). The optimal power amplifier supply voltages may be selected to minimize power consumption while power emissions requirements such as adjacent channel leakage ratio requirements and/or in-band emissions requirements are satisfied.

Figure 9:
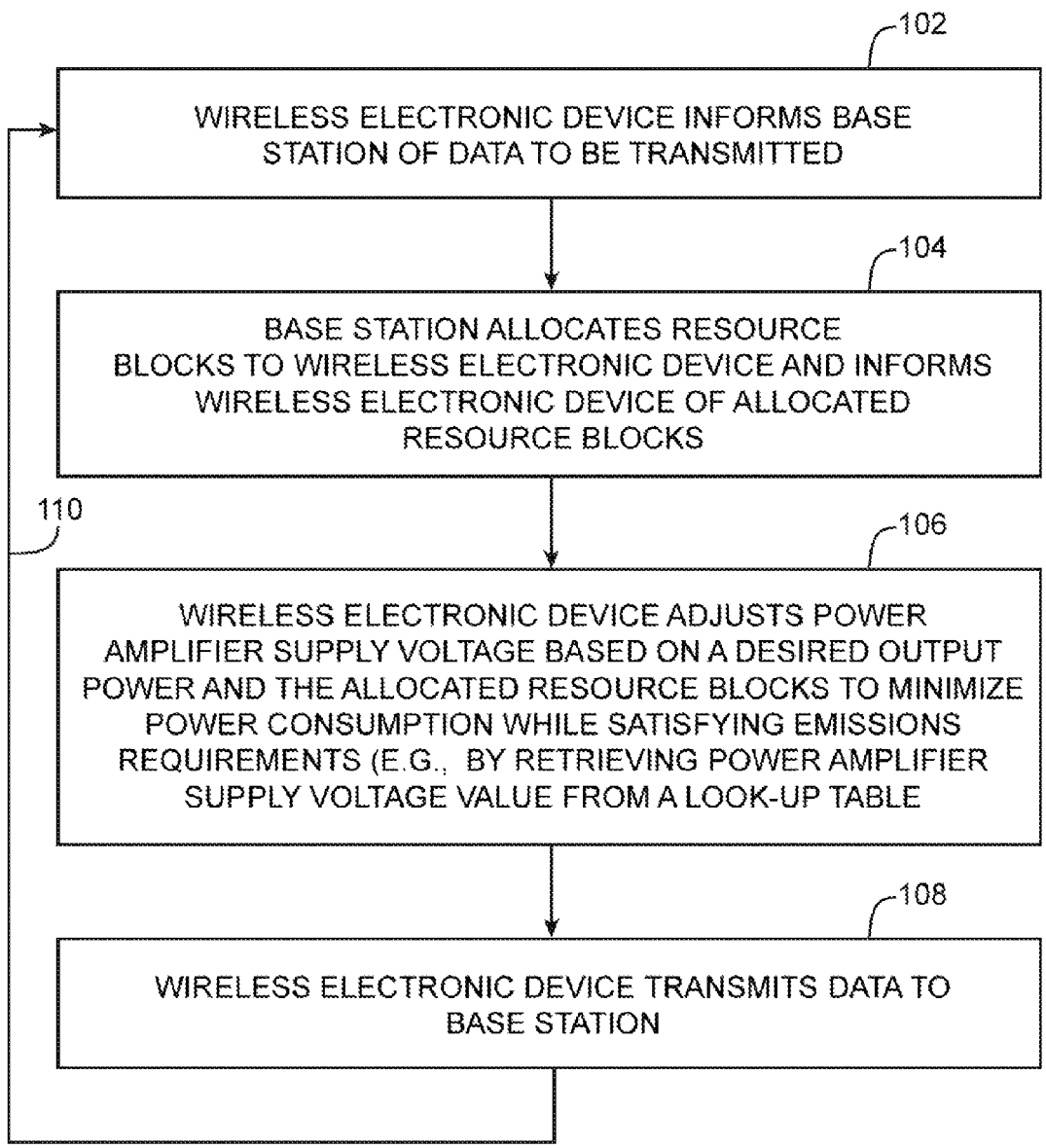
FIG. 9 is a flow chart of illustrative steps involved in determining optimum supply voltage settings for biasing radio-frequency power amplifier circuitry in accordance with an embodiment of the present invention.

To optimize supply voltage Vcc provided to power amplifier circuitry 20 while communicating with a base station 6 on a frequency channel, a wireless electronic device 10 may perform the illustrative steps shown in FIG. 9.

In step 102, wireless electronic device 10 may inform base station 6 of data to be transmitted. For example, wireless electronic device 10 may communicate with a base station 6 using a network standard that allocates resource blocks to devices for transmitting data (e.g., using the LTE standard that allocates resource blocks 52 to device 10). In this scenario, wireless electronic device 10 may inform base station 6 of data to be transmitted from device 10 to base station 6.

In step 104, base station 6 may allocate resource blocks to wireless electronic device 10 and inform device 10 of the allocated resource blocks. As examples, base station 6 may allocate four resource blocks located at the center of a frequency channel, 30 resource blocks of the frequency channel, 12 resource blocks located at the end of the frequency channel, or any other desirable number of available resource blocks within the frequency channel.

In step 106, wireless electronic device 10 may optimize the power amplifier supply voltage based on a desired output power and the allocated resource blocks to minimize power consumption while satisfying emissions requirements (e.g., to satisfy in-band emissions requirements and to satisfy adjacent channel leakage requirements). If desired, device 10 may use calibration values stored in storage and processing circuitry 16 (e.g., values stored in entries of table 92) to optimize the power amplifier supply voltage. For example, device 10 may retrieve an entry of table 92 that identifies an optimal power supply voltage for the desired transmission output power, the number of allocated resource blocks, and the location of the allocated resource blocks within a frequency channel.

In step 108, wireless electronic device 10 may transmit the data to the base station using the resource blocks allocated to the device and while providing the optimized supply voltage to power amplifier circuitry 20. The process may then loop back to step 102 to continuously optimize power supply voltages based on resource block allocation.

The foregoing is merely illustrative of the principles of this invention and various modifications can be made by those skilled in the art without departing from the scope and spirit of the invention.

What is claimed is:

1. Circuitry on a portable electronic device, comprising:
   radio-frequency transceiver circuitry configured to transmit radio-frequency signals in resource blocks within a frequency band containing multiple resource blocks;
   a radio-frequency power amplifier that amplifies radio-frequency signals that are wirelessly transmitted from the radio-frequency transceiver circuitry in the resource blocks;
   adjustable power supply circuitry that supplies an adjustable power supply voltage to the radio-frequency power amplifier; and
   storage and processing circuitry configured to adjust the adjustable power supply voltage supplied by the adjustable power supply circuitry to the radio-frequency power amplifier based at least partly on how many of the resource blocks are being used for wirelessly transmitting the radio-frequency signals, wherein the storage and processing circuitry increases the adjustable power supply voltage for resource blocks located at edges of the frequency band and decreases the adjustable power supply voltage for resource blocks located near a center of the frequency band.

2. The circuitry defined in claim 1 wherein the storage and processing circuitry is configured to store calibration data specifying adjustments to make to the adjustable power supply voltage using the adjustable power supply circuitry based at least partly on how many of the resource blocks are being used for wirelessly transmitting the radio-frequency signals.

3. The circuitry defined in claim 1 wherein the amplified radio-frequency signals are transmitted in the resource blocks at an output power level and wherein the storage and processing circuitry is configured to adjust the adjustable power supply voltage supplied by the adjustable power supply circuitry to the radio-frequency power amplifier based at least partly on the output power level.

4. The circuitry defined in claim 1 wherein the frequency band comprises Long Term Evolution (LTE) band 13 and wherein the storage and processing circuitry is configured to adjust the adjustable power supply voltage supplied by the adjustable power supply circuitry to the radio-frequency power amplifier based at least partly on how many resource blocks within LTE band 13 are being used for wireless transmitting the radio-frequency signals.

5. The circuitry defined in claim 1 wherein the radio-frequency transceiver circuitry is configured to communicate with a base station that allocates to the portable electronic device a selected number of the resource blocks within the frequency band and wherein the storage and processing circuitry is configured to adjust the adjustable power supply voltage supplied by the adjustable power supply circuitry to the radio-frequency power amplifier based at least partly on the selected number of resource blocks.

6. The circuitry defined in claim 1 wherein the frequency band is subject to adjacent band emissions requirements associated with limits on interference between the frequency band and adjacent frequency bands, wherein the resource blocks are subject to in-band emissions requirements associated with limits on interference between resource blocks within the frequency band, and wherein the storage and processing circuitry is configured to store calibration data specifying adjustments that are made to the adjustable power supply voltage to conserve power while satisfying the adjacent band emissions requirements and the in-band emissions requirements.

7. The circuitry defined in claim 6 wherein the calibration data that is stored specifies adjustments that are made to the adjustable power supply voltage to minimize the adjustable power supply voltage to conserve power while ensuring that the adjustable power supply voltage has a value sufficient to ensure that the amplified radio-frequency signals satisfy the adjacent band emissions requirements and the in-band emissions requirements.

8. The circuitry defined in claim 1 wherein the storage and processing circuitry is configured to increase the adjustable power supply voltage in response to identifying an increase in how many of the resource blocks are being used for wirelessly transmitting the radio-frequency signals.

9. The circuitry defined in claim 1 wherein the storage and processing circuitry is configured to decrease the adjustable power supply voltage in response to identifying a decrease in how many of the resource blocks are being used for wirelessly transmitting the radio-frequency signals.

10. The circuitry defined in claim 1 wherein the storage and processing circuitry is configured to increase the adjustable power supply voltage in response to identifying that the resource blocks being used for wireless transmitting the radio-frequency signals are located at an edge of the frequency band.

11. The circuitry defined in claim 1 further comprising:
    a duplexer that receives the amplified radio-frequency signals from the radio-frequency power amplifier, wherein the storage and processing circuitry is configured to adjust the adjustable power supply voltage based at least partly on insertion loss from the duplexer.

12. A method of operating a wireless device that is allocated a number of Long-Term-Evolution (LTE) resource blocks within a LTE frequency band having multiple LTE resource blocks, the method comprising:
    with radio-frequency transceiver circuitry, transmitting radio-frequency signals in the LTE resource blocks within the LTE frequency band;
    with a radio-frequency power amplifier, amplifying radio-frequency signals in at least some of the LTE resource blocks;
    with adjustable power supply circuitry, supplying an adjustable power supply voltage to the radio-frequency power amplifier;
    with storage and processing circuitry, adjusting the adjustable power supply voltage supplied by the adjustable power supply circuitry to the radio-frequency power amplifier based at least partly on how many of the LTE resource blocks in the LTE frequency band are allocated to the wireless device; and with the storage and processing circuitry, controlling the adjustable power supply circuitry to increase the adjustable power supply voltage when one or more of the allocated LTE resource blocks are located at edges of the LTE frequency band and to decrease the adjustable power supply voltage when the allocated LTE resource blocks are located near a center of the LTE frequency band.

13. The method defined in claim 12 wherein adjusting the adjustable power supply voltage comprises increasing the adjustable power supply voltage in response to identifying an increase in how many of the resource blocks are being used for wirelessly transmitting the radio-frequency signals.

14. The method defined in claim 12, wherein the frequency band is subject to adjacent band emissions requirements associated with limits on interference between the frequency band and adjacent frequency bands, wherein the resource blocks are subject to in-band emissions requirements associated with limits on interference between resource blocks within the frequency band, and wherein adjusting the adjustable power supply voltage comprises:

adjusting the adjustable power supply voltage to minimize power consumption while satisfying the adjacent band emissions requirements and the in-band emissions requirements.

15. The method defined in claim 12, wherein the LTE resource blocks in the LTE frequency band that are allocated to the wireless device are allocated to the wireless device by a wireless base station.

16. Wireless communications circuitry configured to communicate with a base station in resource blocks within a frequency band containing multiple resource blocks, wherein the frequency band is subject to adjacent band emissions requirements associated with limits on interference between the frequency band and adjacent frequency bands, and wherein the resource blocks are subject to in-band emissions requirements associated with limits on interference between resource blocks within the frequency band and wherein the frequency band has a center frequency and edge frequencies, the wireless communications circuitry comprising:

an antenna;

a radio-frequency power amplifier that amplifies radio-frequency signals that are transmitted from the electronic device to the base station using a plurality of resource blocks;

adjustable power supply circuitry that supplies an adjustable power supply voltage to the power amplifier circuitry; and storage and processing circuitry configured to adjust the adjustable power supply voltage supplied by the adjustable power supply circuitry to the radio-frequency power amplifier based on where the plurality of resource blocks are located within the frequency band to minimize power consumption while satisfying the adjacent band emissions requirements and the in-band emissions requirements by:

increasing the adjustable power supply voltage when the plurality of resource blocks are near the edge frequencies of the frequency band; and reducing the adjustable power supply voltage when the plurality of resource blocks are near the center frequency of the frequency band.

17. The wireless communications circuitry defined in claim 16 wherein the storage and processing circuitry is configured to adjust the adjustable power supply voltage based at least partly on how many of the resource blocks are being used to communicate with the base station.

18. The wireless communications circuitry defined in claim 16 wherein the storage and processing circuitry is configured to increase the adjustable power supply voltage in response to identifying an increase in how many resource blocks are being used to communicate with the base station.

* * * * *